US012620056B2

(12) United States Patent
Yang et al.

(10) Patent No.: US 12,620,056 B2
(45) Date of Patent: May 5, 2026

(54) METHODS AND SYSTEMS FOR WAVELET DOMAIN-BASED NORMALIZING FLOW SUPER-RESOLUTION IMAGE RECONSTRUCTION

(71) Applicant: ZHEJIANG GONGSHANG UNIVERSITY, Hangzhou (CN)

(72) Inventors: Bailin Yang, Hangzhou (CN); Shaobang Li, Hangzhou (CN); Chao Song, Hangzhou (CN)

(73) Assignee: ZHEJIANG GONGSHANG UNIVERSITY, Hangzhou (CN)

( * ) Notice: Subject to any disclaimer, the term of this patent is extended or adjusted under 35 U.S.C. 154(b) by 412 days.

(21) Appl. No.: 18/335,971

(22) Filed: Jun. 15, 2023

(65) Prior Publication Data

US 2024/0054605 A1 Feb. 15, 2024

(30) Foreign Application Priority Data

Aug. 12, 2022 (CN) .......................... 202210969698.2

(51) Int. Cl.
| | |
|---|---|
| *G06T 3/40* | (2024.01) |
| *G06T 3/4053* | (2024.01) |
| *G06T 7/40* | (2017.01) |

(52) U.S. Cl.
CPC .............. *G06T 3/4053* (2013.01); *G06T 7/40* (2013.01); *G06T 2207/20076* (2013.01)

(58) Field of Classification Search
None
See application file for complete search history.

(56) References Cited

PUBLICATIONS

Yu et al., "Wavelet Flow: Fast Training of High Resolution Normalizing Flows", DOI: https://doi.org/10.48550/arXiv.2010.13821 (Year: 2020).*

Lugmayr et al., "SRFlow: Learning the Super-Resolution Space with Normalizing Flow", DOI: https://doi.org/10.48550/arXiv.2006. 14200 (Year: 2020).*

Hoogeboom et al., "Emerging Convolutions for Generative Normalizing Flows", DOI: https://doi.org/10.48550/arXiv.1901.11137 (Year: 2019).*

(Continued)

*Primary Examiner* — Ian L Lemieux
*Assistant Examiner* — Promotto Tajrian Islam
(74) *Attorney, Agent, or Firm* — METIS IP LLC

(57) ABSTRACT

The present disclosure discloses a method and a system for wavelet domain-based normalizing flow super-resolution image reconstruction. The method includes constructing a training set and a normalizing flow model, wherein the normalizing flow model includes a plurality of levels, each of the plurality of levels including a squeeze layer, two types of conditional mapping layers, a split layer, an activation standard layer, and a quick response (QR) layer; determining a stable normalizing flow model through a wavelet transform, a reconstructed QR layer, and a T-distribution based on the normalizing flow model; determining a wavelet domain-based normalizing flow super-resolution model by adding a refinement layer based on the stable normalizing flow model; training the wavelet domain-based normalizing flow super-resolution model based on the training set; and reconstructing a super-resolution image based on a trained normalizing flow super-resolution model.

19 Claims, 6 Drawing Sheets

(56) References Cited

PUBLICATIONS

Alexanderson and Henter, "Robust Model Training and Generalisation with Studentising Flows", DOI: https://doi.org/10.48550/arXiv.2006.06599 (Year: 2020).*

Woo et al., "CBAM: Convolutional Block Attention Module", DOI: https://doi.org/10.48550/arXiv.1807.06521 (Year: 2018).*

Song et al., "WDFSR: Normalizing flow based on the wavelet-domain for super-resolution", DOI: 10.26599/CVM.2025.9450374 (Year: 2025).*

Kingma and Dhariwal, "Glow: Generative Flow with Invertible 1×1 Convolutions", DOI: https://doi.org/10.48550/arXiv.1807.03039 (Year: 2018).*

* cited by examiner

<u>100</u>

Construction module <u>110</u>

First determination module <u>120</u>

Second determination module <u>130</u>

Training module <u>140</u>

Reconstruction module <u>150</u>

310
Preprocessing a training set for a standard stream model

320
Constructing a wavelet domain-based standard stream super-resolution model

330
Training the wavelet domain-based standard stream super-resolution model

340
Reconstructing a super-resolution image

METHODS AND SYSTEMS FOR WAVELET DOMAIN-BASED NORMALIZING FLOW SUPER-RESOLUTION IMAGE RECONSTRUCTION

CROSS-REFERENCE TO RELATED APPLICATIONS

This application claims the priority of the Chinese Patent Application No. 202210969698.2, filed on Aug. 12, 2022, the entire contents of which are incorporated herein by reference.

TECHNICAL FIELD

The present disclosure belongs to the technical field of computer image processing, and in particular, to a method and a system for wavelet domain-based normalizing flow super-resolution image reconstruction.

BACKGROUND

Due to an influence of external environment or collecting equipment, images often present problems such as low resolutions and a loss of details. With an increase in users' visual experience and application requirements, it is critical to process low-resolution images.

Image super-resolution reconstruction algorithms may be broadly classified into three approaches based on different principles. The three approaches include an interpolation-based approach, a degradation model-based approach, and a learning-based approach. Representative algorithms of the interpolation-based approach mainly include nearest neighbor interpolation, bilinear interpolation, and bicubic interpolation. The degradation model-based approach starts from a degradation model of an image, assuming that a low-resolution image is obtained after a super-resolution image has undergone an appropriate motion transformation, a blur, and noise. This approach constrains the degradation of the super-resolution image by extracting key information from the low-resolution image and combining it with prior knowledge of an unknown super-resolution image. Common techniques of the degradation model-based approach include an iterative inverse projection technique, a convex set projection technique, a maximum posterior probability technique, etc.

With the continuous development of deep learning and its wide application in the field of computer vision, researchers have designed many deep learning-based models to solve the problem. However, image super-resolution reconstruction is a morbid problem because a real low-resolution image may correspond to a plurality of high-resolution images, it cannot be determined that a generated super-resolution image must match the real super-resolution. However, most of the deep learning models at present are deterministically mapped, and the fixed parameters in the network model make a low-resolution image correspond to only one high-resolution image, and a part of the super-resolution images generated by the deep learning models at present are not satisfactory. There are two types of models currently including a model based on a peak signal-to-noise ratio (PSNR) and a model based on visual perception.

In recent years, the normalizing flow model has attracted extensive attention due to its strong generative ability, and thus, it is also used in the field of super-resolution. The normalizing flow model can learn an accurate mapping from complex distributions to simple distributions. Due to the peculiarity of the normalizing flow model, when generating an image, it requires to sample from a simple distribution (e.g., Gaussian distribution), which makes it possible to generate a plurality of super-resolution images with a similar subject but different details in some parts from a same low-resolution image, alleviating the morbid problem of super-resolution reconstruction to a certain extent. However, the super-resolution images generated by this normalizing flow model may also be unsatisfactory, and the normalizing flow model is also not particularly stable during training.

Therefore, there is an urgent need to provide a method and a system for wavelet domain-based normalizing flow super-resolution image reconstruction, which can reconstruct super-resolution images stably and efficiently.

SUMMARY

The present disclosure provides a method for wavelet domain-based normalizing flow super-resolution image reconstruction. The method uses information obtained in the wavelet domain combined with a powerful generative model, i.e., a normalizing flow model, to achieve the reconstruction of high-quality super-resolution images. At the same time, the method proposes a solution that may solve the instability of training the normalizing flow model to a certain extent.

One or more embodiments of the present disclosure provide a method for wavelet domain-based normalizing flow super-resolution image reconstruction implemented by a processor. The method includes: constructing a training set and a normalizing flow model, wherein the normalizing flow model includes a plurality of levels, each of the plurality of levels including a squeeze layer, two types of conditional mapping layers, a split layer, an activation standard layer, and a quick response (QR) layer; determining a stable normalizing flow model through a wavelet transform, a reconstructed QR layer, and a T-distribution based on the normalizing flow model; determining a wavelet domain-based normalizing flow super-resolution model by adding a refinement layer based on the stable normalizing flow model; training the wavelet domain-based normalizing flow super-resolution model based on the training set; and reconstructing a super-resolution image based on a trained normalizing flow super-resolution model.

One or more embodiments of the present disclosure provide a system for wavelet domain-based normalizing flow super-resolution image reconstruction. The system includes: a building module configured for constructing a training set and a normalizing flow model, wherein the normalizing flow model includes a plurality of levels, each of the plurality of levels including a squeeze layer, two types of conditional mapping layers, a split layer, an activation standard layer, and a quick response (QR) layer; a first determination module configured to determine a stable normalizing flow model through a wavelet transform, a reconstructed QR layer, and a T-distribution based on the normalizing flow model; a second determination module configured to determine a wavelet domain-based normalizing flow super-resolution model by adding a refinement layer based on the stable normalizing flow model; a training module configured to train the wavelet domain-based normalizing flow super-resolution model based on the training set; and a reconstruction module configured to reconstruct a super-resolution image based on a trained normalizing flow super-resolution model.

One or more embodiments of the present disclosure provide a non-transitory computer-readable storage medium. The storage medium stores computer instructions, and when a computer reads the computer instructions in the storage medium, the computer implements the above-mentioned method for wavelet domain-based normalizing flow super-resolution image reconstruction.

The present disclosure may include following beneficial effects: by combining the wavelet domain with the normalizing flow model, information obtained from the wavelet domain is used to improve performance of the normalizing flow model, thereby improving quality of the reconstructed super-resolution image and obtaining a high-quality super-resolution image. At the same time, it also makes the normalizing flow model more stable and has good generalization performance.

BRIEF DESCRIPTION OF THE DRAWINGS

FIG. 1 is an exemplary block diagram of a system for wavelet domain-based normalizing flow super-resolution image reconstruction according to some embodiments of the present disclosure;

DETAILED DESCRIPTION

Figure 2:
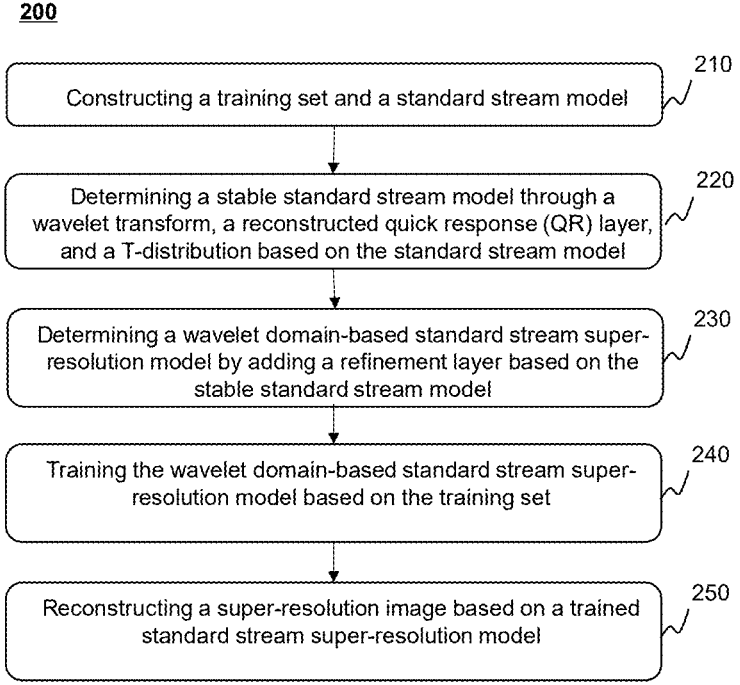
FIG. 2 is an exemplary flowchart of a method for wavelet domain-based normalizing flow super-resolution image reconstruction according to some embodiments of the present disclosure.

The following embodiments are proposed based on inventive concepts of the present disclosure, aiming at a specific problem scenario, and should not be construed as limiting the protection scope of the present disclosure. The technical solutions of the present disclosure will be further described in detail below in conjunction with the accompanying drawings, but the present disclosure should not be regarded as limiting other specific embodiments not described in detail in the present disclosure. As shown in the present disclosure and claims, unless the context clearly prompts the exception, "a", "one", and/or "the" is not specifically singular, and the plural may be included.

FIG. 1 is an exemplary block diagram of a system for wavelet domain-based normalizing flow super-resolution image reconstruction according to some embodiments of the present disclosure.

In some embodiments, a system 100 for wavelet domain-based normalizing flow super-resolution image reconstruction may include a construction module 110, a first determination module 120, a second determination module 130, a training module 140, and a reconstruction module 150.

In some embodiments, the construction module 110 may be configured to determine a stable normalizing flow model through a wavelet transform, a reconstructed quick response (QR) layer, and a T-distribution based on a normalizing flow model. For details about the normalizing flow model, the wavelet transform, the QR layer, the T-distribution, and the stable normalizing flow model, please refer to FIG. 2 and its related descriptions.

In some embodiments, the first determination module 120 may be configured to determine the stable normalizing flow model based on the normalizing flow model through the wavelet transform, the reconstructed QR layer, and the T-distribution.

In some embodiments, the second determination module 130 may be configured to determine a wavelet domain-based normalizing flow super-resolution model by adding a refinement layer based on the stable normalizing flow model. For details about the refinement layer and the wavelet domain-based normalizing flow super-resolution model, please refer to FIG. 2 and its related descriptions.

In some embodiments, the training module 140 may be configured to train the wavelet domain-based normalizing flow super-resolution model based on a training set. For detailed descriptions of the training set, please refer to FIG. 2 and its related descriptions.

In some embodiments, the reconstruction module 150 may be configured to reconstruct a super-resolution image based on a trained normalizing flow super-resolution model.

In some embodiments, the construction module 110 may be further configured to collect a first image data set and a second image data set based on a deep learning super-resolution task, the first image data set being separated into a first component of the training set, a validation set, and a test set; and obtain a third image data set by merging the first component of the training set and the second image data set, randomly cut each image pair of the third data set into a same size, and construct the training set.

In some embodiments, the construction module 110 may also be further configured to construct the normalizing flow model.

In some embodiments, the first determination module 120 may be further configured to add a wavelet transform to the normalizing flow model, transform a distribution of information to be learned into a wavelet domain, and obtain low-frequency information, diagonal detail information, horizontal detail information, and vertical detail information of information to be learned.

In some embodiments, the first determination module 120 may also be further configured to replace a normal distribution with the T-distribution, construct the QR layer through a principle of orthogonal triangular QR decomposition, and obtain the stable normalizing flow model by adding the T-distribution and the QR layer to the normalizing flow model.

In some embodiments, the second determination module 130 may be further configured to add the refinement layer before the stable normalizing flow model, further refine conditional features provided by an encoder, and obtain the wavelet domain-based normalizing flow super-resolution model.

In some embodiments, the second determination module 130 may also be further configured to use the training set to train the wavelet domain-based normalizing flow super-resolution model, and input low-resolution images in the test set into a trained normalizing flow super-resolution model, including: inputting the low-resolution images in the test set into the encoder to obtain the conditional features; obtaining refined features by refining the conditional features through the refinement layer, sampling latent feature variables from a simple distribution, and inputting the latent feature variables to the normalizing flow super-resolution model; and injecting the refined features into a corresponding conditional mapping layer to obtain a high-quality super-resolution image under a conditional feature distribution.

In some embodiments, the system 100 for wavelet domain-based normalizing flow super-resolution image reconstruction may further include a processor, and the processor may process information and/or data related to the system 100 for wavelet domain-based normalizing flow super-resolution image reconstruction to perform one or more functions described in the present disclosure.

It should be understood that the system 100 and its modules shown in FIG. 1 may be implemented in various ways. It should be noted that the above description of the system 100 for wavelet domain-based normalizing flow super-resolution image reconstruction and the modules of the system 100 are only for convenience of description, and do not limit the present disclosure to the scope of the illustrated embodiments. It should be understood that for those skilled in the art, after understanding the principles of the system, it is possible to combine various modules arbitrarily or form a sub-system to connect with other modules without departing from the principles. In some embodiments, what is disclosed in FIG. 1 may be different modules in a system, or one module may realize the functions of the above-mentioned two or more modules. For example, each module may share one storage module, or each module may have its own storage module. Such deformations are within the protection scope of the present disclosure.

FIG. 2 is an exemplary flowchart of a method for wavelet domain-based normalizing flow super-resolution image reconstruction according to some embodiments of the present disclosure. As shown in FIG. 2, a process 200 may include the following steps. In some embodiments, the process 200 may be implemented by a processor.

Step 210: constructing a training set and a normalizing flow model.

In some embodiments, the training set refers to an image data set used for model training. For example, the image data set is used to train a wavelet domain-based normalizing flow super-resolution model. The image data set may include low-resolution images and super-resolution images correspond on a one-to-one basis to the low-resolution images. There may be one or more image data sets, which may be set according to actual needs. For example, the image data set may include a first image data set and a second image data set. The first image data set may include the low-resolution images. The second image data set may include the super-resolution images corresponding to the low-resolution images in the first image data set.

In some embodiments, the image data set may include images in a variety of scenarios, for example, at least one of a surveillance image, a satellite image, a medical image, a general purpose image, etc. For example, in medical imaging, the image data set may include low-resolution images captured by a medical device and processed super-resolution images that correspond to the low-resolution images on a one-to-one basis. In some embodiments, the processor may obtain a trained wavelet domain-based normalizing flow super-resolution model by training the image data set in a plurality of scenarios, which in turn allows the trained wavelet domain-based normalizing flow super-resolution model to be applied to the plurality of scenarios.

In some embodiments, the processor may obtain the trained wavelet domain-based normalizing flow super-resolution model for different application scenarios by training the image data sets in different scenarios, thereby improving accuracy of the super-resolution images output by the trained wavelet domain-based normalizing flow super-resolution model.

In some embodiments, the processor may collect the first image data set and the second image data set based on a deep learning super-resolution task. The processor may separate the first image data set into a first component of the training set, a validation set, and a test set; and obtain a third image data set by merging the first component of the training set and the second image data set, randomly cut each image pair of the third data set into a same size, and construct the training set.

The first component refers to a part of image data of the first image data set.

The validation set refers to a part of image data that is subsequently used to validate an accuracy of the wavelet domain-based normalizing flow super-resolution model.

The test set refers to a part of image data used to test training results of the wavelet domain-based normalizing flow super-resolution model.

The third image data set refers to an image data set used to construct the training set, mainly including the first component of the training set and the second image data set. In some embodiments, the processor may randomly cut each image pair (including a low-resolution image in the first component and a corresponding super-resolution image in the second image data set) in the third image data set into the same size as training samples in the training set.

In some embodiments, the normalizing flow model may include a plurality of levels, each of the plurality of levels includes a squeeze layer, two types of conditional mapping layers, a split layer, an activation standard layer, and a QR layer.

In some embodiments, the squeeze layer may be used to process a size of a channel dimension of a feature corresponding to an image, or the like.

In some embodiments, the two types of conditional mapping layers may be used to enhance mapping learning abilities of the normalizing flow model based on a conditional feature distribution normalizing flow.

In some embodiments, the split layer may be used to divide the channel dimension of the feature corresponding to the image into two parts.

In some embodiments, the QR layer may be used to exchange information on the channel dimension of the feature.

In some embodiments, the activation standard layer may implement an activated mapping transformation using a scale and a deviation parameter of each channel to initialize the scale and the deviation parameter. For more description of the normalizing flow model, please refer to the related description of FIG. 3.

In some embodiments, any one of split layers in the normalizing flow model may be used to, through a current split layer, split data into a first part of data with a first dimension value and a second part of data with a second dimension value. The first part of the data may be learned through a data mapping relationship, the second part of the data may be regularized to the T-distribution. The first dimension value and the second dimension value may be determined based on a depth of the current split layer. For more information about the mapping relationship and the T-distribution, please refer to the related descriptions of FIG. 3.

The first dimension value may represent a count of features of the first part of the data input to the current split layer. The first part of the data may be a part of data representing a part of features in the data. The second dimension value may represent a count of features of the second part of the data input to the current split layer. The second part of the data may be remaining data in which the above-mentioned part of features is removed from the data. In some embodiments, the first part of the data and the second part of the data may be divided by random allocation.

The depth of the current split layer refers to a sequence of the current split layer in the plurality of levels of the normalizing flow model. For example, if the normalizing flow model includes 6 levels, according to a sequence of input and output of the plurality of levels of the normalizing flow model, the first level is the first layer, and the current split layer corresponding to the first level is the first layer, then the depth of the current split layer is 1. In this manner, the depth of the current split layer may be 2, 3, 4, 5, 6, etc.

In some embodiments, the processor may determine the first dimension value and the second dimension value of the current split layer based on the depth of the current split layer in various ways. For example, the first dimension value may be inversely proportional to the depth of the current split layer, and the second dimension value may be proportional to the depth of the current split layer. The larger the value of the depth of the current split layer, the smaller the first dimension value, and the larger the second dimension value. As another example, based on the depth of the current split layer, the first dimension value and the second dimension value of the current split layer may be manually determined through experience.

In some embodiments of the present disclosure, through the current split layer, the data is split into the first part of the data with the first dimension value and the second part of the data with the second dimension value. The greater the depth of the current split layer, the deeper the data is input and the more transformations the input data undergo. Reducing a percentage (i.e., the first dimension value) of the first part of the data that continues to learn the data mapping relationship can effectively reduce an amount of calculation and improve calculation efficiency without affecting the training effect.

In some embodiments, the first dimension value and the second dimension value may be related to an image complexity of the training set, and the image complexity includes at least one of a color complexity, a texture complexity, and a shape complexity.

The image complexity refers to relevant information that may characterize features of an image.

The color complexity refers to information that may characterize colors of the image. The color complexity may describe a color value (RGB value) distribution presented by pixels in the image through a color matrix. For example, the color complexity may represent a degree of chaos (i.e., an entropy value of the color matrix) of the color matrix in the image.

The texture complexity refers to information that may characterize image textures. The texture complexity may describe a spatial color distribution and a light intensity distribution of the image or a small area of the image through a texture matrix. For example, the texture complexity may characterize a degree of chaos of the texture matrix (i.e., an entropy value of the texture matrix) in the image.

The shape complexity refers to information that may characterize shapes of the image. The shape complexity may describe an image edge feature distribution through an image shape matrix. For example, the shape complexity may characterize a degree of chaos of the shape matrix (i.e., an entropy value of the shape matrix) in the image.

In some embodiments, the processor may determine the image complexity of the image in the training set through image processing techniques. For example, the processor may determine the color value distribution (i.e., the color matrix) presented by pixels in the image, and determine the entropy value of the color matrix as the color complexity. The processor may determine a spatial color distribution and a light intensity distribution (i.e., the texture matrix) of the image or a small area in the image, and determine the entropy value of the texture matrix as the texture complexity. The processor may determine the image edge feature distribution (i.e., the shape matrix), and determine the entropy value of the shape matrix as the shape complexity. The processor may determine an average value of three entropy values of the determined color matrix, the determined texture matrix, and the determined shape matrix as the image complexity.

In some embodiments, the processor may determine the first dimension value and the second dimension value corresponding to the current split layer through a preset table according to the image complexity of the image in the training set.

The preset table may include correspondences between different image complexities and first dimension values and between different image complexities and second dimension values. For example, it is supposed that an input dimension of an i-th split layer is ni, when the image complexity in the preset table is x, a percentage of the second dimension value is a %, a percentage of the second dimension value is (1−a %), the first dimension value of the i-th split layer is ni*a %, and the second dimension value of the i-th split layer is ni*(1−a %). The input dimension refers to a total count of features of the data input to the current split layer.

In some embodiments, the image complexity in the preset table may be proportional to the percentage of the first dimension value, and inversely proportional to a percentage of the second dimension value. The greater the image complexity, the larger the percentage of the first dimension value, and the smaller the percentage of the second dimension value.

In some embodiments, the preset table may be set manually in advance or adjusted to actual needs based on historical training.

In some embodiments, values determined by the processor through the preset table may be estimated values of the first dimension value and the second dimension value. The processor may determine a final first dimension value and a final second dimension value based on the estimated values and the depth of the current split layer. For example, the first dimension value of the i-th split layer is [(ni×a %)−k] and the second dimension value of the i-th split layer is [ni*(1−a %)+k], wherein k is positively related to the depth of the i-th split layer.

In some embodiments of the present disclosure, relating the first dimension value and the second dimension value to the image complexity of the training set can improve the accuracy of the determined first dimension value and the determined second dimension value, which is more conducive to better learning of a transformation function that transforms a complex distribution to a simple distribution during training.

Step 220: determining the stable normalizing flow model through a wavelet transform, a reconstructed QR layer, and a T-distribution based on the normalizing flow model.

In some embodiments, the processor may add the wavelet transform to the normalizing flow model, transform the distribution of information to be learned into the wavelet domain, and obtain the low-frequency information, the diagonal detail information, the horizontal detail information, and the vertical detail information of the information to be learned, etc.

The low-frequency information refers to information related to low frequencies of the image, for example, an outline of the image, or the like. The diagonal detail information refers to information related to diagonal details of the image. For example, the diagonal details may be information such as a brightness distribution of the image along a main diagonal. The horizontal detail information refers to information related to horizontal details of the image, for example, horizontal shadow changes of the image, or the like. The vertical detail information refers to information related to vertical details of the image, for example, vertical shadow changes of the image, or the like.

In some embodiments, the processor may obtain the stable normalizing flow model by replacing the normal distribution with the T-distribution and by adding the T-distribution and the QR layer constructed based on the principle of orthogonal triangular QR decomposition to the normalizing flow model. For more details on the above, please refer to the description of FIG. 3.

Step 230: determining the wavelet domain-based normalizing flow super-resolution model by adding a refinement layer based on the stable normalizing flow model.

In some embodiments, the processor may add the refinement layer before the stable normalizing flow model, further refine conditional features provided by the encoder, and obtain the wavelet domain-based normalizing flow super-resolution model. More details may be found in the relevant descriptions of FIG. 3.

Step 240: training the wavelet domain-based normalizing flow super-resolution model based on the training set.

In some embodiments, the processor may train the wavelet domain-based normalizing flow super-resolution model based on the training set determined in step 210. Please refer to the related descriptions of FIG. 3 for a detailed explanation.

In some embodiments, during the training of the wavelet domain-based normalizing flow super-resolution model, the processor may dynamically determine a standard deviation of the T-distribution based on at least one of a current count of iteration rounds or at least one training sample. For more explanation about the standard deviation of the T-distribution, please refer to the related descriptions of FIG. 3.

In some embodiments, the standard deviation $\tau 0$ of the T-distribution may be determined according to the count of the current iteration round. For example, as the count of the iteration rounds increases, $\tau 0$ may gradually approach 1 from 0. The count of the iteration rounds experienced by different $\tau 0$ values is different. For example, the closer the $\tau 0$ value is to 1, the more the count of iteration rounds may be experienced.

In some embodiments of the present disclosure, the standard deviation of the T-distribution may be dynamically determined based on at least one of the current count of iteration rounds or at least one training sample, thereby improving the accuracy of the dynamically determined standard deviation, which is conducive to improving the accuracy and efficiency of the training.

For example, in each iteration round of the training process, the processor may determine the standard deviation of the T-distribution of the current iteration round based on a depth texture feature of at least one training sample for the current iteration round.

The depth texture feature refers to information related to the image textures. In some embodiments, the depth texture feature may include at least one of a gray-scale co-occurrence matrix, a local binary pattern, a manually marked texture type, or the texture complexity. The manually marked texture type may be various preset texture types. The texture complexity refers to a degree of chaos of the texture matrix in the image. The texture complexity is a part of the image complexity. For related content about the image complexity, refer to step 210 and related descriptions.

In some embodiments, the processor may determine the depth texture feature of at least one training sample by using an image processing technique, or the like. In some embodiments, the processor may determine the depth texture feature through a preset algorithm. For example, the processor may calculate the gray-scale co-occurrence matrix and the local binary pattern of the at least one training sample through a preset algorithm. The preset algorithm may include Gray-level Co-occurrence Matrix (GLCM), Local Binary Patterns (LBP), etc.

In some embodiments, the processor may perform the wavelet transform on the at least one training sample to determine sample information of the at least one training sample, wherein the sample information includes at least one of sample low-frequency information, sample diagonal detail information, sample horizontal detail information, or sample vertical detail information. Based on the sample information, the processor may respectively determine the depth texture features through a texture evaluation model, wherein the texture evaluation model may be a machine learning model.

In some embodiments, an input of the texture evaluation model may include the sample low-frequency information, the sample diagonal detail information, the sample horizontal detail information, the sample vertical detail information, or the like. An output may be the depth texture feature. The texture evaluation model may process the above input to determine depth texture sub-features 1, 2, 3, 4, etc., and determine the output depth texture feature by a weighted summation. A weight value may be set in advance according to actual needs. The depth texture sub-features 1, 2, 3, 4, etc., may respectively correspond to the depth texture features including the sample low-frequency information, the sample diagonal detail information, the sample horizontal detail information, the sample vertical detail information, etc.

In some embodiments, the processor may perform training through various approaches based on a specific training sample and a label of the specific training sample corresponding to the texture evaluation model to obtain a trained texture evaluation model. For example, the training may be processed based on a gradient descent. The specific training sample may include historical low-frequency information, historical diagonal detail information, historical horizontal detail information, and historical vertical detail information, and the label of the specific training sample may be an actual depth texture feature corresponding to the specific training sample. The specific training sample may be obtained from historical data. The label of the specific training sample may be manually labeled.

In some embodiments of the present disclosure, by determining the depth texture feature through the texture evaluation model, the efficiency and accuracy of the determined depth texture feature can be improved, which is conducive to improving the accuracy of the standard deviation of the subsequently determined T-distribution, thereby improving the readiness and efficiency of the training.

In some embodiments, the processor may determine a standard deviation of the T-distribution of the current iteration round in various ways. For example, the processor may determine the standard deviation of the T-distribution of the current iteration round based on the depth texture feature and a preset correspondence between the depth texture feature and the standard deviation of the T-distribution of the current iteration round.

In some embodiments of the present description, determining the standard deviation of the T-distribution through the depth texture feature can improve the accuracy of the determined standard deviation of the T-distribution, which is conducive to improving training readiness and efficiency.

Step 250: reconstructing the super-resolution image based on a trained normalizing flow super-resolution model.

In some embodiments, the processor may obtain the super-resolution image based on the low-resolution image through the trained normalizing flow super-resolution model. The trained normalizing flow super-resolution model may be applied to a variety of scenarios where the super-resolution image needs to be reconstructed, for example, surveillance scenarios, remote sensing fields such as satellite imaging fields, medical imaging fields, other general-purpose image processing fields, etc. For example, in medical imaging fields, the normalizing flow super-resolution model may be used to improve resolutions of medical images, allowing the low-resolution image that is limited by the capabilities of medical devices to be converted to the super-resolution image, and output the reconstructed super-resolution image by analyzing an original image with the trained normalizing flow super-resolution model, thus improving the accuracy of medical images and making it easier, faster, and more accurate for doctors to observe lesions, etc.

In some embodiments of the present disclosure, the method for wavelet domain-based normalizing flow super-resolution image reconstruction can improve the quality of the obtained super-resolution image, and contribute to improving the performance of the normalizing flow model by combining the wavelet domain with the normalizing flow model. In addition, by using information obtained from the wavelet domain, the quality of the reconstructed super-resolution image can be improved, and high-quality super-resolution images can be obtained. At the same time, the method also makes the normalizing flow model more stable and has good generalization performance.

Figure 3:
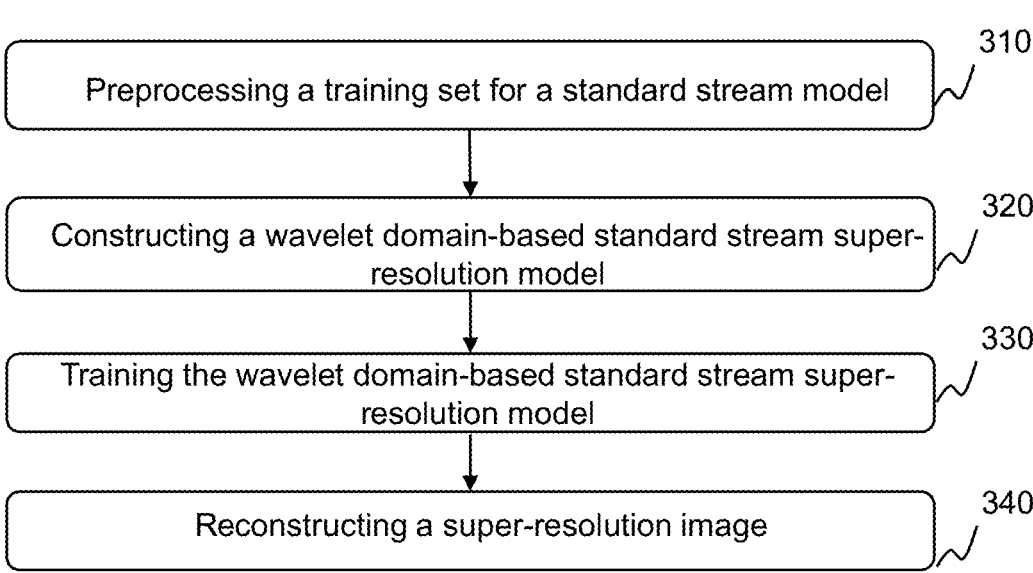
FIG. 3 is a flowchart of a process for reconstructing a super-resolution image through the method for wavelet domain-based normalizing flow super-resolution image reconstruction according to some embodiments of the present disclosure.

FIG. 3 is a flowchart of a process for reconstructing a super-resolution image by a method for wavelet domain-based normalizing flow super-resolution image reconstruction according to some embodiments of the present disclosure. In some embodiments, a process 300 may be implemented by a processor.

The flowchart of the method for wavelet domain-based normalizing flow super-resolution image reconstruction is shown in FIG. 3, and the process 300 includes the following steps: Step 310, preprocessing a training set of a normalizing flow model. Step 320, constructing a wavelet domain-based normalizing flow super-resolution model. Step 330, training the wavelet domain-based normalizing flow super-resolution model. Step 340, reconstructing a super-resolution image.

In some embodiments, the processor may construct the training set of the normalizing flow model, construct and train the wavelet domain-based normalizing flow super-resolution model, combine latent feature variables sampled from a simple distribution with a low-resolution image, and input the latent feature variables and the low-resolution image to the model to reconstruct a high-quality super-resolution image.

In some embodiments, the high-quality super-resolution image refers to an image whose relevant parameters meet a certain preset requirement. The preset requirement may include that a sharpness is greater than a sharpness threshold, a resolution is greater than a resolution threshold, or the like. The sharpness threshold and the resolution threshold may be set according to actual needs.

In some embodiments, the processor may first preprocess the training set of the normalizing flow model.

S1: collecting a first image data set and a second image data set based on a deep learning super-resolution task, the first image data set being separated into a first component of the training set, a validation set, and a test set; and obtaining a third image data set by merging the first component of the training set and the second image data set, randomly cutting each image pair of the third data set into a same size, and constructing the training set. The processor may collect the first image data set (such as a DIV2K image data set) and the second image data set (such as a Flicker2K image data set) commonly used in the super-resolution task based on deep learning, and separate DIV2K into the first component of the training set, the validation set, and the test set. The first component of a DIV2K training set is merged with a complete Flicker2K data set to obtain the third image data set. Each image pair (including one super-resolution image and one low-resolution image) in the third image data set is randomly cut into an image pair with the same size (such as 160×160 pixels), which is used to construct a complete training set suitable for the wavelet domain-based normalizing flow super-resolution model.

In some embodiments, the processor may construct the wavelet domain-based normalizing flow super-resolution model.

Figure 4:
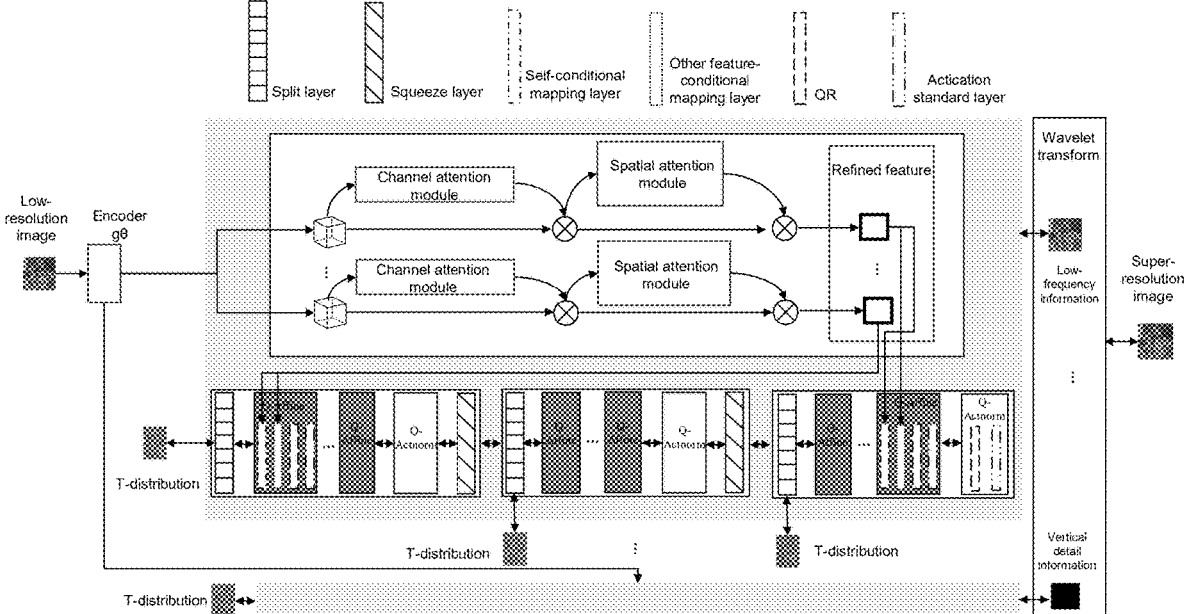
FIG. 4 is a specific structure diagram of a network used by the method for wavelet domain-based normalizing flow super-resolution image reconstruction according to some embodiments of the present disclosure.

S2: constructing the normalizing flow model. FIG. 4 is a specific structure of a network used by the method for wavelet domain-based normalizing flow super-resolution image reconstruction. The structure consists of L levels (scales), where a part (e.g., a half) of a feature is split out at the end of each level, and the split-out feature obeys the T-distribution (instead of Gaussian distribution) to calculate its negative log-maximum likelihood loss, and the remaining part (e.g., the other half) of the feature continues to be used for the learning of the normalizing flow model.

First, the processor may use a wavelet transform to convert a high quality super-resolution image in an RGB domain into four different types of information in the wavelet domain. The four different types of information include low-frequency information, diagonal detail information, horizontal detail information, and vertical detail information of information to be learned. An encoder gθ processes an input low-resolution image to obtain new features as conditional features, which are subsequently used as an input of a refinement layer. For each type of the information, an independent normalizing flow model is used to learn an observed simple distribution (T-distribution).

In some embodiments, the normalizing flow model has a same structure for each layer at different scales, including a squeeze layer, a split layer, a Q-Affine block, and a Q-Actnorm block, except for the first level (the first scale) where there is no squeeze layer.

In some embodiments, the Q-Affine block may contain an activation standard layer, a QR layer, and the two types of conditional mapping layers.

In some embodiments, the Q-Actnorm block may contain an activation standard layer and a QR layer.

In some embodiments, the squeeze layer enlarges a channel dimension of a feature to four times of an original size and compresses a length dimension and a width dimension to one-half of the original size, the squeeze layer being reversible.

In some embodiments, the conditional mapping layer includes a self-conditional mapping layer and an other feature-conditional mapping layer, which are used to enhance mapping learning abilities of a normalizing flow model based on a conditional feature distribution and improve the quality of generated images.

In some embodiments, the split layer is reversible and configured to mainly process the channel dimension of the feature, allowing a part (e.g., half) of the channel dimension of the feature to continue to let the model learn the mapping relationship, and making another part (e.g., another half) of the channel dimension of the feature obey the T-distribution, which not only reduces a training time but also increases the performance of the model to a certain extent.

In some embodiments, the QR layer is a network layer for improving mapping abilities of the normalizing flow model and for exchanging information on the channel dimension of the feature In some embodiments, the activation standard layer implements an activated mapping transformation using a scale and a deviation parameter of each channel, similar to batch standardization, and initializes the scale and the deviation parameter so that a posterior behavior action for the each channel has a zero mean value and unit variance under a situation of a given initial small batch of data. After the initialization, the scale and the deviation are considered as regular trainable parameters independent of the data. Understandably the activation standard layer may preprocess the input data.

In some embodiments, the normalizing flow model is a reversible model, which may learn the mapping between an observed complex distribution and the observed simple distribution (i.e., multivariate Gaussian or chi-square distribution z as follows:

$$z = f^{-1}(x)$$

where f represents a model based on the normalizing flow and x represents the observed distribution (i.e., a complex distribution). Since the network needs to be able to compute a Jacobian matrix, each level of the network may be designed to be a Jacobian matrix that is very easy to compute. Meanwhile, the performance of a single-layer normalizing flow model is limited due to reversibility. In order to ensure good network performance, a multi-level normalizing flow model may be used for stacking, so $f = f_1 * f_2 \ldots f_{N-1} * F_N$ may be constructed.

According to a chain rule, each $f_1$ may generate an intermediate result $h_1$, which eventually leads to a simple distribution z. Since $f_1$ is reversible, the simple distribution z may also obtain the complex distribution x through $f_1$, as shown in the following formula:

$$x \overset{f_1}{\leftrightarrow} h_1 \overset{f_2}{\leftrightarrow} h_2 \leftrightarrow \cdots \leftrightarrow h_{N-1} \overset{f_N}{\leftrightarrow} z$$

Due to its special network structure, the normalizing flow model may be trained by optimizing only one negative log-maximum likelihood loss (a negative log-maximum likelihood value). According to a variation of a variable formula and the chain rule, for a sample, a log-maximum likelihood value may be calculated as:

$$\log p(x; \theta) = \log p_z(z) + \sum_{i=1}^{N} \log \left| \det \frac{\partial f_i}{\partial f_{i-1}} \right|$$

In the above formula, x represents the complex distribution (super-resolution image), z represents the simple distribution (T-distribution), N represents a count of stacks of the stream model, $f_i$ represents a single-layer normalizing flow model, i represents a stream model of an i-th layer, det represents a determinant, $\theta$ represents a parameter in the model, $p_z(z)$ represents the maximum likelihood value of the distribution z, log represents finding a logarithm, $p_z(x;\theta)$ represents the log-maximum likelihood value of the complex distribution x, and $$\sum_{i=1}^{N} \log \left| \det \frac{\partial f_i}{\partial f_{i-1}} \right|$$

represents a sum of absolute logarithms of determinants of Jacobian matrices for all of the stream models.

The model based on the normalizing flow may be trained by optimizing the negative log-maximum likelihood value $-\log p (x)$. For a normalizing flow model based on a conditional distribution (i.e., a model that relies on inputting other conditional features to learn the relationship between the simple distribution and the complex distribution), the wavelet domain-based super-resolution network is also the normalizing flow model based on the conditional distribution, and its initial formula is as follows:

$$p_{x|e}(x|e, \theta) = p_z\big(f_\theta^{-1}(x; e)\big) \left| \det \frac{\partial f_\theta}{\partial x}(x; e) \right|$$

wherein e represents that a sum of features of a low-quality image, $$z = f_\theta^{-1}(x; e),$$

and Z represents the simple distribution, $$\left| \det \frac{\partial f_\theta}{\partial x}(x; e) \right|$$

represents an absolute value of the determinant of the Jacobian matrix of the stream model, $$p_z\big(f_\theta^{-1}(x; e)\big)$$

represents the maximum likelihood value of the simple distribution z, and $p_{x|e}(x|e,\theta)$ represents the maximum likelihood value of the complex distribution x under the features of e.

Finally, the normalizing flow model is optimized by using the negative log-maximum likelihood value. An optimization formula for the wavelet domain-based super-resolution normalizing flow model is as follows:

$$\mathcal{L}(\theta; x, e) =$$

$$-\log p_{x|e}(x|e, \theta) = -\sum_{i=1}^{4}\log p_z\left(f_\theta^{-1}(y_i; e)\right) - \sum_{i=1}^{4}\log\left|\det\frac{\partial f_\theta}{\partial y_i}(y_i; e)\right|$$

wherein $y_i$ represents the horizontal detail information, the vertical detail information, the diagonal detail information of the image, and an area of the low-frequency information, respectively, $-\log p_{x|e}(x|e, \theta)$ represents the negative log-maximum likelihood value of the complex distribution X under the features of e, $$-\sum_{i=1}^{4}\log\left|\det\frac{\partial f_\theta}{\partial y_i}(y_i; e)\right|$$

represents a sum of absolute values of logarithms of Jacobian matrix determinants of four branch stream models, $$-\sum_{i=1}^{4}\log p_z\left(f_\theta^{-1}(y_i; e)\right)$$

represents a sum of the negative log-maximum likelihood values of the simple distributions corresponding to each of the four branch stream models.

Training with a single negative log-maximum likelihood loss allows the network to eventually converge, but in practice, the network converges very slowly and may not reach an optimal value due to a lack of supervision. Because the wavelet domain-based super-resolution network is capable of performing one-to-many mapping relationships, i.e., simultaneously generating PSNR-oriented (i.e., peak signal-to-noise ratio, which is an objective criterion for evaluating images) or perception-oriented images. Higher PSNR values may be obtained if an L1 pixel loss or an L2 pixel loss is added to an original negative log-maximum likelihood. Training with the L1 pixel loss is more stable than training with the L2 pixel loss, which may obtain a better result may be obtained. The training loss function may then be the following formula:

$$L = \mu_1 L_{nll} + \lambda_2 L_{pixel}(x, x_{\tau=0})$$

In the above formula, x represents the super-resolution image in the training set, $x_{\tau=0}$ represents the super-resolution image generated by the model that samples latent variables from a T-distribution with a standard deviation of 0, $L_{nll}$ represents the negative log-maximum likelihood value with $\lambda_1$ as its coefficient. $L_{pixel}$ represents the pixel loss with $\lambda_2$ as its coefficient. If a perception loss is added to the negative log-maximum likelihood loss, the perception-oriented image with better visual quality may be generated, and the training loss function may become as follows:

$$L = \lambda_1 L_{nll} + \lambda_2 L_{pixel}(x, x_{\tau=0}) + \lambda_3 L_{percep}(x, x_{\tau=\tau0})$$

wherein $x_{\tau=\tau0}$ represents a visual perception-oriented image (i.e., images more consistent with human visual perception and with more texture features) generated by sampling latent variables from a T-distribution with a standard deviation of $\tau0$, $L_{nll}$ represents the negative log-maximum likelihood, $L_{percep}$ represents the perception loss with $\lambda_3$ as its coefficient. When $\tau0$ is set to 0.9 during training, better perception-oriented images may be generated.

S3: adding the wavelet transform to the normalizing flow model, transforming a distribution of information to be learned into the wavelet domain, and obtaining the low-frequency information, the diagonal detail information, the horizontal detail information, and the vertical detail information of the information to be learned. In order to output higher-quality images and more realistic high-frequency content, in traditional image processing tasks, approaches based on frequency-domain enhancement may also improve the quality of generated images in low-level vision tasks. Compared with Fourier transform and discrete cosine transform, the wavelet transform considers both spatial domain information and frequency domain information, which is simple and effective. In some embodiments, the processor may transform the high-quality image into the wavelet domain for learning, only using the wavelet transform once. The formula is as follows:

$$A, H, V, D = Harr(X)$$

In the above formula, Harr(X) represents implementing the wavelet transform on X and obtaining feature information of X, A, H, V, D, which represent the high-quality image, the horizontal detail information, the vertical detail information, the diagonal detail information, and the area of the low-frequency information, respectively, and their feature channel dimensions are one-fourth of a channel dimension of X, and their lengths and widths are one-half of a length and a width of X.

S4: replacing a normal distribution with the T-distribution, constructing the QR layer through a principle of orthogonal triangular QR decomposition, and obtaining a stable normalizing flow model by adding the T-distribution and the QR layer to the normalizing flow model. In order to construct the stable normalizing flow model, it is necessary to implement operations of replacing the normal distribution with the T-distribution, constructing the QR layer through the principle of orthogonal triangular QR decomposition, and adding the T-distribution and the QR layer to the normalizing flow model. Both of the two operations are indispensable, and either of them acting alone may not achieve a performance of the combined scheme.

4.1 The QR layer is the network layer for improving the mapping abilities of the normalizing flow model and for exchanging information on the channel dimension of the feature. Using a QR decomposition provides better performance and flexibility compared to a PLU decomposition and better stability compared to a 1×1 convolutional layer. Similar to PLU parameterization, the QR decomposition is stabilized by choosing W=Q(R+diag(s)), Q refers to an orthogonal matrix, R refers to a strict triangular matrix, the elements in matrix s are non-zero, and diag outputs a diagonal of the s matrix. According to a principle of orthogonal matrix, Q may be constructed through a plurality of orthogonal matrix $Q_i$ chains, i.e., $Q = Q_1 * \ldots * Q_n$, to ensure its flexibility. Generally speaking, in order to ensure efficiency, n is set to a count of channels of data, and each $Q_i$ may be expressed as follows:

$$Q_i = 1 - 2\frac{k_i k_i^T}{k_i^T k_i}$$

wherein I is an (n×n) dimensional diagonal matrix with all diagonals being 1, a parameter in an i-th matrix $k_i$ is learnable and is a (n×1) dimensional matrix, $$k_i k_i^T$$

is an (n×n) dimensional matrix, $$k_i^T k_i$$

represents a scalar, and T represents a transpose operation.

4.2 Different distributions have different features, which may affect the generalization performance and training process of the model. During the training process, a Gaussian probability corresponding to an abnormal data point may be relatively low, which may cause problems such as log(0), resulting in zero loss or huge loss fluctuations, thereby making the training process unstable. A general solution is to reduce a learning rate or use gradient clipping. However, using gradient clipping may pull the training process to a different optimal solution with a performance that may not be very good. Therefore, in some embodiments, using the T-distribution instead of a multivariate Gaussian distribution may improve the generalization performance and training stability of the network without changing the learning rate or using the gradient clipping. For data that does not meet assumptions of the normalizing flow model, the T-distribution is less affected by outliers and less penalized than the Gaussian distribution, and the normalizing flow model using the T-distribution is more stable and has better generalization performance. A probability density function used to calculate a loss of the T-distribution of a channel dimension of a feature D is:

$$p_t\left(y; \mu, \sum, \upsilon\right) =$$

$$\gamma\left(\frac{\upsilon+D}{2}\right)\left(\gamma\left(\frac{\upsilon}{2}\right)\right)^{-1}\left|\upsilon\pi\sum\right|^{-\frac{1}{2}} \cdot \left(1 + \frac{1}{\upsilon}(y-\mu)^T\sum{}^{-1}(y-\mu)\right)^{-\frac{\upsilon+D}{2}}$$

In the above formula, y represents feature data, μ represents a mean value, Σ represents a covariance, D represents the channel dimension of the feature, υ is called a degree of freedom and generally greater than 0, and when it tends to infinity, the T-distribution changes into a normal distribution.

$$\gamma(\alpha) = \int_0^{+\infty} x^{\alpha-1}e^{-x}dx$$

represents taking a value of a gamma function for α, and in the wavelet domain-based standard super-resolution model, υ is set to 20.

S5: adding the refinement layer before the stable normalizing flow model to obtain the wavelet domain-based normalizing flow super-resolution model. In order to further refine the conditional features provided by the encoder to improve the performance of the normalizing flow model and improve the quality of images generated by the method for wavelet domain-based normalizing flow super-resolution image reconstruction, the refinement layer is added before the stable normalizing flow model to obtain the wavelet domain-based normalizing flow super-resolution model. Although extracting a partially pre-trained residual-in-residual dense blocks (RRDB) network (which is a classic super-resolution model) as the encoder for the wavelet domain-based normalizing flow may extract features from images well, output dimensions are large, and some dimensions are unimportant. Therefore, the refinement layer is added to refine the conditional features for better performance. In some embodiments, the refinement layer mainly consists of the plurality of attention modules for refining the conditional features. In addition, in some embodiments, a convolution block attention module (CBAM), which is a combination of a channel attention module (CAM) and a spatial attention module (SAM), is used as the attention module. The refinement layer is not inserted into the encoder, but as an independent small network module, and each two conditional mapping layers correspond to an independent attention module in the refinement layer, instead of sharing the attention module to learn different scale layers. Through the attention modules, important channels and certain spatial parts of the features obtained by the encoder are focused and emphasized, respectively.

S6: using the training set to train the wavelet domain-based normalizing flow super-resolution model, inputting the low-resolution images in the test set into the trained normalizing flow super-resolution model and inputting the low-resolution images in the test set into the encoder to obtain the conditional features; obtaining refined features by refining the conditional features through the refinement layer, sampling the latent feature variables from the simple distribution, and inputting the latent feature variables to the normalizing flow super-resolution model; and injecting the refined features into the corresponding conditional mapping layer to obtain the high-quality super-resolution image under the conditional feature distribution.

In the training process, the complete training set obtained in S1 may be used for training the wavelet domain-based normalizing flow model. A method for the wavelet domain-based normalizing flow super-resolution model has a combination of three model losses (i.e., $L_{nll}$, ($L_{nll}$+$L_{pixel}$), and ($L_{nll}$+$L_{percep}$+$L_{pixel}$)). $L_{nll}$ represents a loss of a basic model method, ($L_{nll}$+$L_{pixel}$) represents a loss of a PSNR-based enhanced model method, and ($L_{nll}$+$L_{percep}$+$L_{pixel}$) represents a loss of enhancing a visual perception-based model method. For the basic model method, 150K periods (a count of training rounds) are trained. For the PSNR-based enhanced model method, 30K periods are trained on the original basic model. For the visual perception-based enhanced model, 20K periods are trained on the original basic model.

In some embodiments, the processor may input the low-resolution images in the test set into the pre-trained wavelet domain-based normalizing flow super-resolution model, use a part of the pre-trained RRDB as the encoder for feature extraction, input the low-resolution images into the encoder to obtain the conditional features, and then obtain the refined features by further refining the conditional features through the refinement layer. In some embodiments, contrary to the training process, the normalizing flow model is a reversible network. The latent feature variables are sampled the simple distribution (T-distribution) into the normalizing flow super-resolution model and inputted to the normalizing flow super-resolution model, while simultaneously the refined features are injected into the corresponding conditional mapping layer, and finally the complex distribution under the conditional feature distribution (i.e., the high-quality super-resolution image) is estimated.

Figure 5:
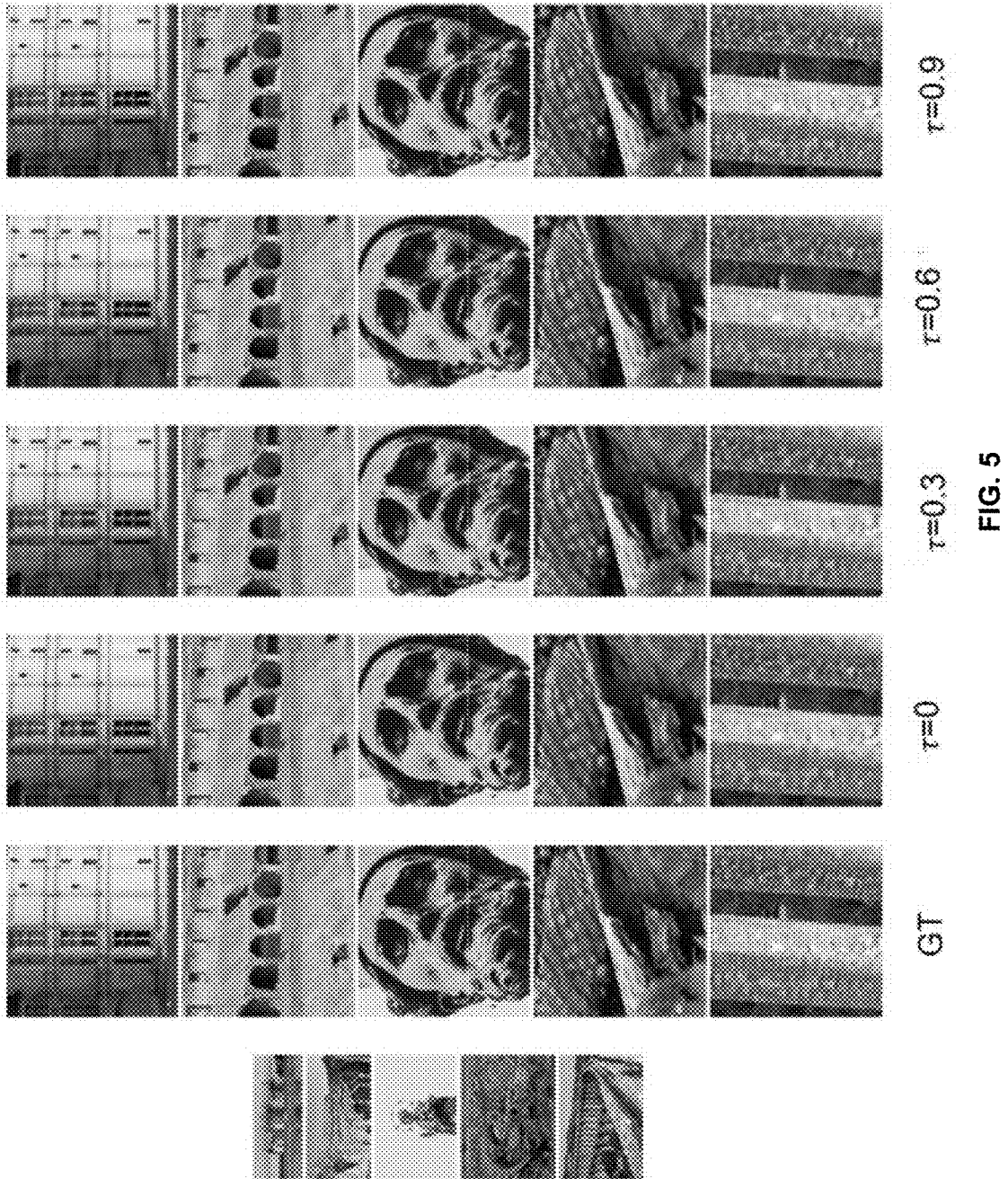
FIG. 5 is a schematic diagram of different styles of images generated from a same image by the method for wavelet domain-based normalizing flow super-resolution image reconstruction according to some embodiments of the present disclosure.

FIG. 5 is a schematic diagram of different styles of images generated from a same image by a method for wavelet domain-based normalizing flow super-resolution image reconstruction, in which GT represents super-resolution true value images. When using the method for wavelet domain-based normalizing flow super-resolution image reconstruction to obtain super-resolution images, latent feature variables need to be randomly sampled from a T-distribution with a standard deviation $\tau$, which means that a wavelet domain-based normalizing flow model may realize one-to-many mapping relationships from the low-resolution images to the super-resolution images. When the standard deviation $\tau$ is close to 0, the image is PSNR-orientated with a similar blurring effect. When the standard deviation $\tau$ is close to 1, the image is perception-oriented with sharper textures and edges.

Figure 6:
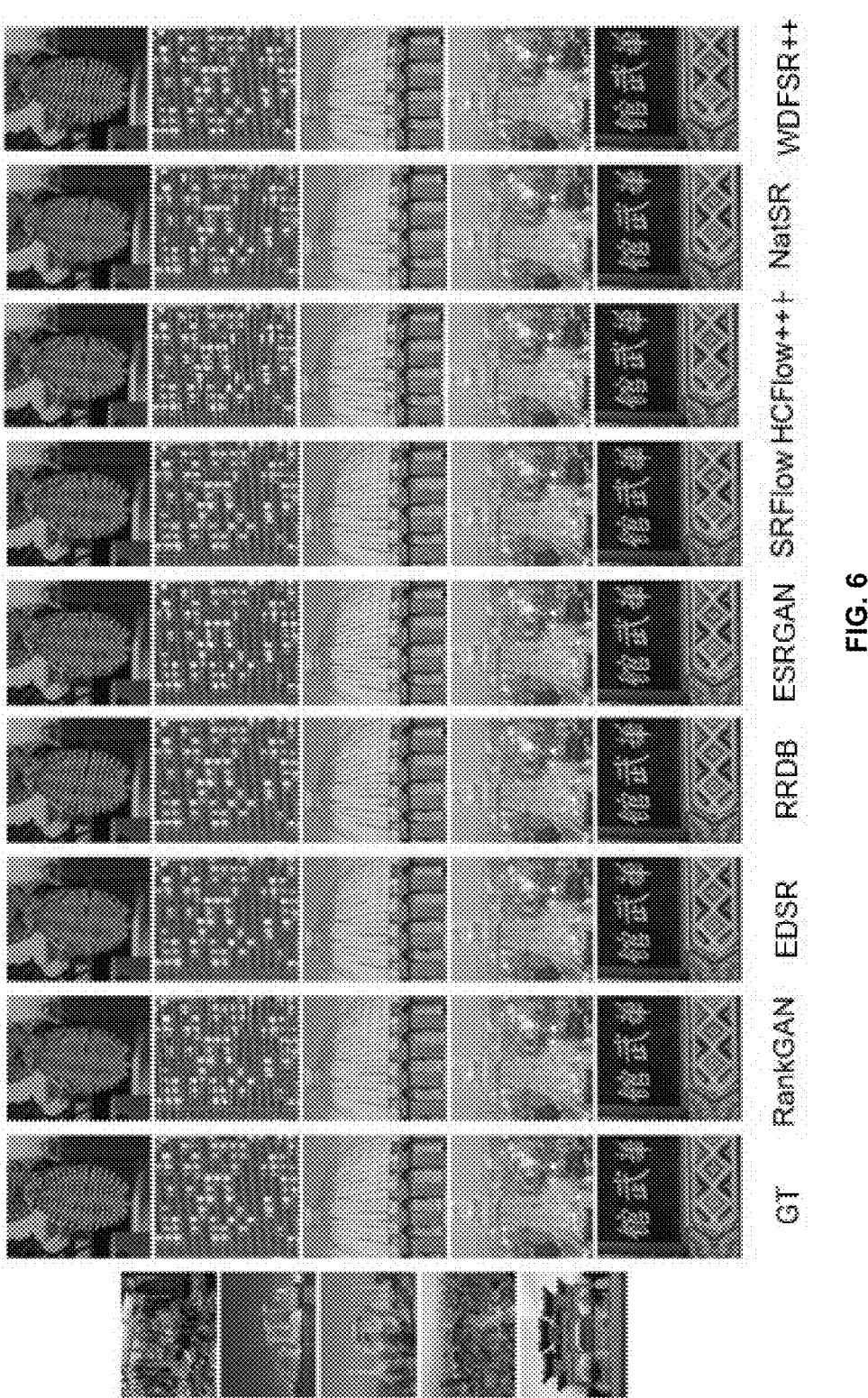
FIG. 6 is a comparison diagram of super-resolution images generated by the method for wavelet domain-based normalizing flow super-resolution image reconstruction according to some embodiments of the present disclosure with super-resolution images generated by other methods.

FIG. 6 is a comparison diagram of super-resolution images generated by the method for wavelet domain-based normalizing flow super-resolution image reconstruction with super-resolution images generated by other methods, in which GT represents super-resolution true value images, and RankGAN, ESRGAN, and NatSR are all super-resolution models based on visual perception. EDSR and RRDB are PSNR-based super-resolution models, and HCFlow$_{++}$ and SRFlow are normalizing flow models. WDFSR$_{++}$ is the method for wavelet domain-based normalizing flow super-resolution image reconstruction. It is easy to see that compared with other methods, the method for wavelet domain-based normalizing flow super-resolution image reconstruction generates more realistic and clearer textures.

At the same time, the method in the present disclosure is also a universal and comprehensive image processing method, which may also be applied to the application of image low-light enhancement.

The descriptions of the embodiments in the present disclosure include technical terms such as negative log-maximum likelihood, normalizing flow, PSNR, and perception loss, etc., requiring expertise and understanding for those skilled in the art who want to implement the method for wavelet domain-based normalizing flow super-resolution image reconstruction.

Although the embodiments of the present disclosure have been shown and described, it should be understood by those skilled in the art that a variety of variations, modifications, replacements, and variants of these embodiments may be made without departing from the principle and spirit of the present disclosure. The scope of the present disclosure is limited by the appended claims and their equivalents.

What is claimed is:

1. A method for wavelet domain-based normalizing flow super-resolution image reconstruction implemented by a processor, the method comprising:

constructing a training set and a normalizing flow model, wherein the normalizing flow model includes a plurality of levels, each of the plurality of levels including a squeeze layer, two types of conditional mapping layers, a split layer, an activation standard layer, and a quick response (QR) layer;

determining a stable normalizing flow model through a wavelet transform, the QR layer constructed through a principle of orthogonal triangular QR decomposition, and a T-distribution based on the normalizing flow model;

determining a wavelet domain-based normalizing flow super-resolution model by adding a refinement layer based on the stable normalizing flow model, wherein during a training process of the wavelet domain-based normalizing flow super-resolution model, a standard deviation of the T-distribution is dynamically determined based on at least one of a current count of iteration rounds or at least one training sample;

training the wavelet domain-based normalizing flow super-resolution model based on the training set; and reconstructing a super-resolution image based on a trained normalizing flow super-resolution model.

2. The method according to claim 1, further comprising:

S1: collecting a first image data set and a second image data set based on a deep learning super-resolution task, the first image data set being separated into a first component of the training set, a validation set, and a test set; and obtaining a third image data set by merging the first component of the training set and the second image data set, randomly cutting each image pair of the third data set into a same size, and constructing the training set;

S2: constructing the normalizing flow model;

S3: adding the wavelet transform to the normalizing flow model, transforming a distribution of information to be learned into the wavelet domain, and obtaining low-frequency information, diagonal detail information, horizontal detail information, and vertical detail information of the information to be learned;

S4: replacing a normal distribution with the T-distribution, constructing the QR layer through a principle of orthogonal triangular QR decomposition, and obtaining the stable normalizing flow model by adding the T-distribution and the QR layer to the normalizing flow model;

S5: adding the refinement layer before the stable normalizing flow model, further refining conditional features provided by an encoder, and obtaining the wavelet domain-based normalizing flow super-resolution model; and S6: using the training set to train the wavelet domain-based normalizing flow super-resolution model, and inputting low-resolution images in the test set into the trained normalizing flow super-resolution model, including:

inputting the low-resolution images in the test set into the encoder to obtain the conditional features;

obtaining refined features by refining the conditional features through the refinement layer, sampling latent feature variables from a simple distribution, and inputting the latent feature variables to the trained normalizing flow super-resolution model; and injecting the refined features into a corresponding conditional mapping layer to obtain a high-quality super-resolution image under a conditional feature distribution.

3. The method according to claim 2, wherein in S2, the squeeze layer enlarges a channel dimension of a feature to four times of an original size and compresses a length dimension and a width dimension to one-half of the original size, the squeeze layer being reversible;

the two types of conditional mapping layers include a self-conditional mapping layer and an other feature-conditional mapping layer, which are used to enhance mapping learning abilities of the normalizing flow model based on a conditional feature distribution;

the split layer is reversible for processing the channel dimension of the feature, allowing half of the channel dimension of the feature to continue to let the normalizing flow model learn a mapping relationship and another half of the channel dimension of the feature to obey the T-distribution;

the QR layer is a network layer for improving mapping abilities of the normalizing flow model and configured to exchange information on the channel dimension of the feature; and the activation standard layer is configured to implement an activated mapping transformation using a scale and a deviation parameter of each channel and initializing the scale and the deviation parameter.

4. The method according to claim 2, wherein the normalizing flow model in S2 is a reversible model, and the each level is designed based on a Jacobian matrix.

5. The method according to claim 2, wherein a first level of the normalizing flow model described in S2 does not have the squeeze layer.

6. The method according to claim 2, wherein the refinement layer in S5 includes a plurality of attention modules, and every two conditional mapping layers correspond to an independent attention module in the refinement layer.

7. The method according to claim 6, wherein the attention modules include a channel attention module and a spatial attention module.

8. The method according to claim 1, wherein any one of split layers in the normalizing flow model configured to:

through a current split layer, split data into a first part of data with a first dimension value and a second part of data with a second dimension value, wherein the first part of data is learned through a data mapping relationship, the second part of data is regularized as the T-distribution, and the first dimension value and the second dimension value are determined based on a depth of the current split layer.

9. The method according to claim 8, wherein the first dimension value and the second dimension value are related to an image complexity of the training set, and the image complexity includes at least one of a color complexity, a texture complexity, and a shape complexity.

10. The method according to claim 1, wherein in each iteration round of the training process, determining the standard deviation of the T-distribution includes:

determining a standard deviation of a T-distribution of a current iteration round based on a depth texture feature of at least one training sample of the current iteration round.

11. The method according to claim 10, wherein determining the depth texture feature includes:

determining sample information of the at least one training sample by performing the wavelet transform on the at least one training sample, wherein the sample information includes at least one of sample low-frequency information, sample diagonal detail information, sample horizontal detail information, and sample vertical detail information; and determining the depth texture feature through a texture evaluation model based on the sample information, respectively, wherein the texture evaluation model is a machine learning model.

12. A system for wavelet domain-based normalizing flow super-resolution image reconstruction, wherein the system comprises:

a building module configured for constructing a training set and a normalizing flow model, wherein the normalizing flow model includes a plurality of levels, each of the plurality of levels including a squeeze layer, two types of conditional mapping layers, a split layer, an activation standard layer, and a quick response (QR) layer;

a first determination module configured to determine a stable normalizing flow model through a wavelet transform, the QR layer constructed through a principle of orthogonal triangular QR decomposition, and a T-distribution based on the normalizing flow model;

a second determination module configured to determine a wavelet domain-based normalizing flow super-resolution model by adding a refinement layer based on the stable normalizing flow model, wherein during a training process of the wavelet domain-based normalizing flow super-resolution model, a standard deviation of the T-distribution is dynamically determined based on at least one of a current count of iteration rounds or at least one training sample;

a training module configured to train the wavelet domain-based normalizing flow super-resolution model based on the training set; and a reconstruction module configured to reconstruct a super-resolution image based on a trained normalizing flow super-resolution model.

13. The system according to claim 12, wherein the building module is further configured to:

collect a first image data set and a second image data set based on a deep learning super-resolution task, the first image data set being separated into a first component of the training set, a validation set, and a test set; and obtain a third image data set by merging the first component of the training set and the second image data set, randomly cutting each image pair of the third data set into a same size, and construct the training set; and construct the normalizing flow model;

the first determination module is further configured to:

add the wavelet transform to the normalizing flow model, transform a distribution of information to be learned into the wavelet domain, and obtain low-frequency information, diagonal detail information, horizontal detail information, and vertical detail information of the information to be learned; and replace a normal distribution with the T-distribution, construct the QR layer through a principle of orthogonal triangular QR decomposition, and obtain the stable normalizing flow model by adding the T-distribution and the QR layer to the normalizing flow model;

the second determination module is further configured to:

add the refinement layer before the stable normalizing flow model, further refine conditional features provided by an encoder, and obtain the wavelet domain-based normalizing flow super-resolution model; and the training module is further configured to:

use the training set to train the wavelet domain-based normalizing flow super-resolution model, and input low-resolution images in the test set into the trained normalizing flow super-resolution model, including:

inputting the low-resolution images in the test set into the encoder to obtain the conditional features;

obtaining refined features by refining through the refinement layer, sampling latent feature variables from a simple distribution, and inputting the latent feature variables to the trained normalizing flow super-resolution model; and injecting the refined features into a corresponding conditional mapping layer to obtain a high-quality super-resolution image under a conditional feature distribution.

14. The system according to claim 13, wherein the squeeze layer enlarges a channel dimension of a feature to four times of an original size and compresses a length dimension and a width dimension to one-half of the original size, the squeeze layer being reversible;

the two types of conditional mapping layers include a self-conditional mapping layer and an other feature-conditional mapping layer, which are used to enhance mapping learning abilities of the normalizing flow model based on a conditional feature distribution;

the split layer is reversible for processing the channel dimension of the feature, allowing half of the channel dimension of the feature to continue to let the normalizing flow model learn a mapping relationship and another half of the channel dimension of the feature to obey the T-distribution;

the QR layer is a network layer for improving mapping abilities of the normalizing flow model and configured to exchange information on the channel dimension of the feature; and the activation standard layer is configured to implement an activated mapping transformation using a scale and a deviation parameter of each channel and initializing the scale and the deviation parameter.

15. The system according to claim 13, wherein the normalizing flow model is a reversible model, and the each level is designed based on a Jacobian matrix.

16. The system according to claim 13, wherein a first level of the normalizing flow model does not have the squeeze layer.

17. The system according to claim 12, wherein the refinement layer includes a plurality of attention modules, and every two conditional mapping layers correspond to an independent attention module in the refinement layer.

18. The system according to claim 17, wherein the attention modules include a channel attention module and a spatial attention module.

19. A non-transitory computer-readable storage medium, wherein the storage medium stores computer instructions, and when reading the computer instructions in the storage medium, a computer implements the method according to claim 1.

* * * * *